(12) United States Patent
Georgy (10) Patent No.: US 9,961,308 B2
(45) Date of Patent: May 1, 2018

(54) MULTISPECTRAL IMAGE CAPTURE DEVICE COMPRISING A FILTER WHEEL

(71) Applicant: AIRBUS DEFENCE AND SPACE SAS, Les Mureaux (FR)

(72) Inventor: Pierre-Luc Georgy, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days. days.

(21) Appl. No.: 15/118,136

(22) PCT Filed: Dec. 24, 2014

(86) PCT No.: PCT/EP2014/079332
§ 371 (c)(1),
(2) Date: Aug. 11, 2016

(87) PCT Pub. No.: WO2015/120948
PCT Pub. Date: Aug. 20, 2015

(65) Prior Publication Data
US 2017/0180684 A1    Jun. 22, 2017

(30) Foreign Application Priority Data

Feb. 14, 2014 (FR) .................................... 14 00409

(51) Int. Cl.
*H04N 5/235* (2006.01)
*H04N 9/097* (2006.01)
(Continued)

(52) U.S. Cl.
CPC ............. *H04N 9/097* (2013.01); *G02B 7/006* (2013.01); *H04N 5/2353* (2013.01); *H04N 5/23229* (2013.01); *H04N 7/183* (2013.01)

(58) Field of Classification Search
CPC .. H04N 9/097; H04N 5/23229; H04N 5/2353; H04N 7/183; G02B 7/006
(Continued)

(56) References Cited

U.S. PATENT DOCUMENTS 2,304,081 A    12/1942 Goldmark
3,603,722 A     9/1971 Graham
(Continued)

FOREIGN PATENT DOCUMENTS

GB           852505       10/1960

OTHER PUBLICATIONS

International Preliminary Report on Patentability (IPRP), dated Mar. 14, 2016, Application No. PCT/EP2014/079332.
(Continued)

*Primary Examiner* — Hee-Yong Kim
(74) *Attorney, Agent, or Firm* — Young & Thompson (57) ABSTRACT

A multispectral image capture device includes a filter wheel (4) and an image sensor. The filters (41-46) are located close to a focusing plane of a light beam used to form the images, and at least one of the filters is more angularly narrow than the optical field of the image sensor. The production of the filter is thereby facilitated. Advantageously, the filters are closer to one another in the wheel such that multiple filters are in the optical field of the sensor simultaneously. Each multispectral image can be captured more quickly than when each filter covers the entire optical field of the sensor.

18 Claims, 4 Drawing Sheets

(51) Int. Cl.
*G02B 7/00* (2006.01)
*H04N 7/18* (2006.01)
*H04N 5/232* (2006.01)

(58) Field of Classification Search
USPC ........................................................ 348/144
See application file for complete search history.

(56) References Cited

U.S. PATENT DOCUMENTS

| | | |
|---|---|---|
| 3,715,473 A | 2/1973 | Tan |
| 3,821,793 A | 6/1974 | Carson |
| 4,101,931 A | 7/1978 | Yaggy |
| 5,654,549 A | 8/1997 | Landecker et al. |
| 2012/0300064 A1 | 11/2012 | Mann et al. |
| 2017/0150029 A1* | 5/2017 | Robertson ............... G06T 5/002 |

OTHER PUBLICATIONS

International Search Report (ISR), dated Mar. 17, 2015; Application No. PCT/EP2014/079332.

* cited by examiner

MULTISPECTRAL IMAGE CAPTURE DEVICE COMPRISING A FILTER WHEEL

BACKGROUND OF THE INVENTION

Field of the Invention

The present invention relates to a multispectral image capture device, which comprises a filter wheel, as well as a method for collecting a multispectral image.

Description of the Related Art

Several methods exist for capturing multispectral images by using a single image capture device. One of them consists of using several spectral filters that are interposed alternately along the path of a light beam used for forming each image that is captured. Such a multispectral image capture device usually comprises:

- an image-forming optical system, suitable for forming an image in a focal plane;
- at least one two-dimensional image sensor, comprising a photosensitive surface that is limited by a peripheral contour and situated in the focal plane;
- a filter wheel, that comprises a plurality of spectral filters without overlaps between two adjacent filters; and
- a drive system, arranged in order to rotate the wheel about an axis of rotation, so as to bring each of the filters into the light beam.

The filter wheel is generally placed so that the filters are brought into a pupil of the image-forming optical system. But it is also known to place the wheel so as to keep the filters in a focusing plane of the light beam. Such a focusing plane may correspond to an intermediate image that is formed by the image-forming optical system. In this case, the focusing plane is generally called intermediate image plane. Usually, the filters are not situated exactly in the intermediate image plane, but close to this plane, in order to avoid a defect that is present on the filters appearing clearly in the image that is captured. Alternatively, the focusing plane may be the focal plane in which the photosensitive surface of the image sensor is located. The filter wheel is then situated in immediate proximity to the photosensitive surface, but with an intermediate space in order to avoid the filters rubbing on the photosensitive surface. For such devices existing before the present invention, each image is captured by the sensor while a single one of the filters covers the whole of its photosensitive surface, or covers the whole of a portion of the intermediate image plane that is optically conjugated with the entire photosensitive surface of the image sensor. The rotation of the wheel then successively brings each filter into this position.

Figure 1:
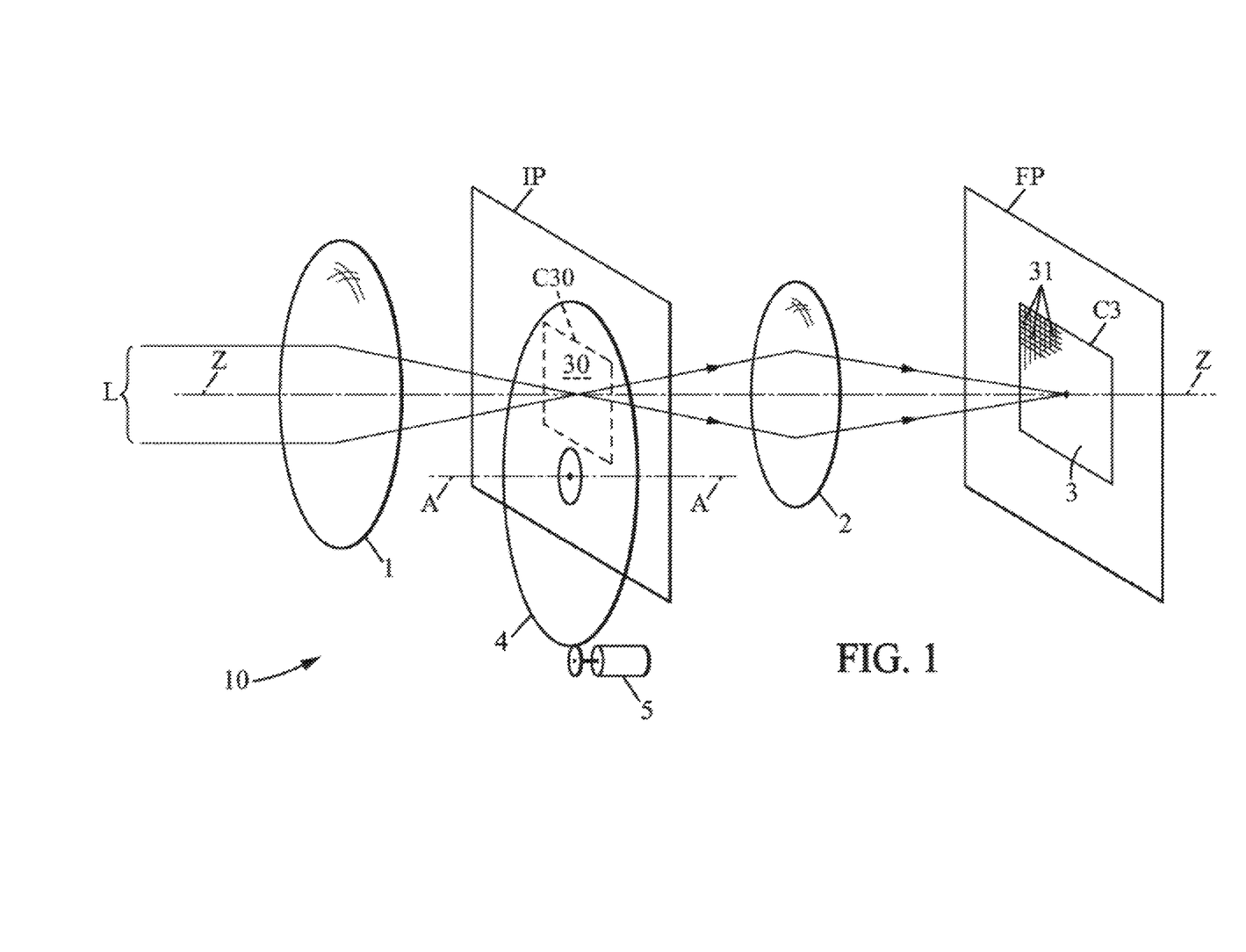
FIG. 1, already described, diagrammatically represents a multispectral image capture device as known before the invention, and which can be modified according to the present invention.
Figure 2:
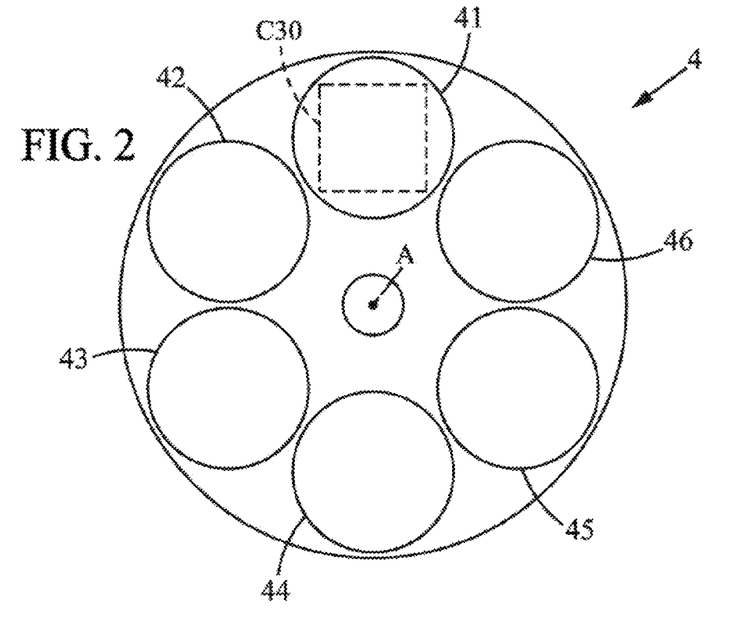
FIG. 2, already described, represents a filter wheel as known before the present invention.

FIGS. 1 and 2 show such a device, with the reference numbers that are indicated in these figures having the following meanings:

10 multispectral image capture device
1 objective
2 re-imaging system
Z-Z optical axis of the multispectral image capture device
L light beam forming the captured image
3 image sensor
31 photosensitive pixels of the image sensor 3, corresponding to the pixels that are acquired individually during each exposure of the image sensor
C3 peripheral contour of the photosensitive surface of the image sensor 3
FP focal plane of the image-forming optical system, in which the photosensitive surface of the image sensor 3 is placed
IP intermediate image plane, which constitutes an additional focusing plane for the light beam L, with respect to the focal plane FP
30 portion of the intermediate image plane IP that is optically conjugated by the re-imaging system 2 with the entire photosensitive surface of the image sensor 3
C30 peripheral limit of the portion 30 of the intermediate image plane IP
4 filter wheel
A-A axis of rotation of the filter wheel 4
5 system for driving the wheel 4 in rotation
41-46 spectral filters borne by the wheel 4, for example six in number The objective 1 and the re-imaging system 2 together constitute the image-forming optical system. This optical system may be centred along the optical axis Z-Z. For an image-forming optical system constituted in this way, the objective 1 forms an intermediate image, in the plane IP, of a scene that is contained in the input field of this optical system, then the re-imaging system 2 in its turn forms, from this intermediate image, the final image in the focal plane FP, which is captured by the sensor 3. The peripheral contour C3 of the photosensitive surface of the sensor 3 is optically conjugated by the re-imaging system 2 with the limit C30 within the intermediate image plane IP. The wheel 4 is placed close to the intermediate image plane IP, with the axis of rotation A-A of the wheel being parallel to the optical axis Z-Z. In the devices known before the present invention, one of the filters 41-46 entirely covers the portion 30 of the intermediate plane IP that is situated inside the limit C30, for certain predetermined positions of the wheel 4 about the axis A-A. FIG. 2 shows the wheel 4 in the position in which the filter 41 is active for the image that is captured by the sensor 3. Sufficient rotation of the wheel 4 makes it possible to replace the filter 41 in this position with one of the other filters 42-46. Thus, six images can be successively captured of the same scene that is contained in the input field of the image-forming optical system, in order to constitute a multispectral image of this scene having six spectral components.

In the remainder of the present description, by "image" is meant a set of reading values of the photosensitive pixels 31, which results from a single exposure of all the photosensitive pixels 31 of the image sensor 3. The term "spectral image" specifically denotes each spectral component of a multispectral image. In a multispectral image capture device according to FIGS. 1 and 2, each image is directly a spectral image.

But such a multispectral image capture device has the following drawbacks:

- the surface of each filter is quite large, and the larger the surface area, the more difficult and expensive it is to produce a filter of sufficient optical quality, free from point defects and uniform with respect to its filtering characteristics;
- the period of acquisition of a complete multispectral image, constituted by several spectral image captures for different positions of the filter wheel, cannot be reduced below a minimum period that is imposed by the speed of rotation of the filter wheel. But using a drive system that is more rapid, and therefore more powerful, causes greater vibration, which creates its own problems;

the number of filters placed in the wheel is limited by its size, and a larger wheel also requires an increase in the power of the drive system, in order to rotate the wheel with an angular velocity that remains identical;

capturing high-definition images requires the use of sensors having a larger photosensitive surface. The filters must then be larger themselves, and as a result so must the wheel that holds them;

even more importantly, capturing high-definition images requires a reduction in the vibration of the device, and in particular that produced by the drive system while rotating the filter wheel. Such a requirement thus appears contrary to an increase in the power of the drive system;

the development of multispectral imaging tasks, in particular in the field of spatial imaging, is towards an increase in the number of filters; and the shortest possible total period of capture of a multispectral image is sought, both in order to increase the frequency of multispectral image capture, in order to reduce artefacts caused by movement of the device or by mobile elements present in the scene acquired.

SUMMARY OF THE INVENTION

Starting from this situation and of new requirements in the field of multispectral imaging, a purpose of the present invention is to reduce the aforementioned drawbacks and limitations of the devices of the prior art.

More particularly, a first purpose of the invention consists of increasing the number of the filters borne by the wheel, without increasing the size of the wheel as much as for a filter wheel as is known from the prior art.

A second particular purpose of the invention is to allow more rapid rotation of the filter wheel, without significantly increasing the power of its drive system.

A third particular purpose of the invention is to make it possible to capture successive multispectral images more rapidly.

Finally, a fourth purpose of the invention is to reduce the effective period between the capture times of two spectral images that are part of one and the same multispectral image, in order to reduce colour artefacts that appear for moving objects in the input field of the image-forming optical system.

In order to achieve at least one of these purposes or others, a first aspect of the invention proposes to modify a multispectral image capture device such as described above, in which the filters are held parallel by the wheel close to the focal plane or the intermediate image plane of the image-forming optical system. According to the modifications introduced by the invention, at least one of the filters, called filter having a narrow angular sector, has an angular extension that is less than the angular extension of the photosensitive surface of the image sensor when the filters are close to the focal plane. Alternatively, the angular extension of the filter having a narrow angular sector is less than that of a portion of the intermediate image plane which is optically conjugated with the entire photosensitive surface by the re-imaging part of the image-forming optical system. To this end, the angular extensions are measured with respect to the axis of rotation of the wheel.

In other words, the at least one of the filters that is borne by the wheel does not cover the whole optical field of the image sensor when an image is captured. The surface area of this filter is thus reduced, so that its manufacture is facilitated and its cost is reduced, for the same optical quality requirement of the filter. In fact, it is easier to manufacture filters in smaller sizes, which are free from point defects, defects of flatness and spectral filtering inhomogeneities, with respect to filters that each cover the whole of the optical field of the image sensor.

Preferentially, the filter having a narrow angular sector can be situated in the wheel between two other filters, and close thereto, such that for any position of the wheel about the axis of rotation so that at least a portion of the filter having a narrow angular sector is effective for a part of the image contained within the peripheral contour of the photosensitive surface of the image sensor, then a portion of at least one of the other two filters is simultaneously effective for another part of the same image contained within the peripheral contour of the photosensitive surface. In other words, portions of several filters are situated simultaneously within the optical field of the image sensor. The image that is captured during an exposure of the sensor therefore contains a part of this image that is captured through one of the filters, and also at least one other part of this same image that is captured through another one of the filters. A complete spectral image, which is filtered uniformly by a single one of the filters, can be reconstructed by joining together the parts of images that relate to this filter, and were captured during successive exposures of the image sensor.

Preferably, the angular extension of the filter having a narrow angular sector and the respective angular extensions of the other two filters can be such that for at least one position of the wheel about the axis of rotation, respective portions of the filter having a narrow angular sector and of the other two filters are simultaneously effective for three separate parts of the image contained within the peripheral contour of the photosensitive surface. More generally, it may be preferable for respective portions of a greater number of filters to be simultaneously in the optical field of the detector, in order to reduce the individual size of each filter. Moreover, the filters are advantageously brought closer to each other in the wheel, with minimum areas of the wheel between two adjacent filters, in order to reduce the part of the optical field of the image sensor that is masked by the areas of the wheel that have no filter, during each exposure.

Such an arrangement of the filters makes it possible to bring them closer to the axis of rotation of the wheel, so that the wheel can be smaller and lighter. For the same power of the system driving the wheel in rotation, it can rotate more quickly, or the rotational drive system can be made smaller while still retaining an identical of speed of rotation of the filter wheel.

In simple embodiments of the invention, the respective angular extensions of the filter having a narrow angular sector and of the other two filters that are adjacent thereto in the wheel, with respect to the axis of rotation of the wheel and for the same radial distance from this axis of rotation, may be equal.

In certain embodiments of the invention, the drive system may be adapted in order to bring the wheel to successive positions about the axis of rotation, and in order to immobilize it in each of these positions during at least one period of exposure of the image sensor.

In other embodiments of the invention, the drive system may be adapted in order to rotate the wheel continuously while several images are successively captured by the image sensor. In this case, when the image sensor comprises a plurality of separate photosensitive pixels, each adapted in order to operate according to an acquisition sequence that comprises successively, at least one phase of signal accumulation and one phase of reading an accumulated signal, the angular extension of the filter having a narrow angular sector can advantageously be greater than an angle of rotation described by the wheel during the sum of a total period of the acquisition sequence and a period of an additional accumulation phase. Thus, each photosensitive pixel of the image sensor can carry out individually at least one complete acquisition sequence of a pixel value, while this pixel is exposed to the light beam through the filter having a narrow angular sector.

In various embodiments of the invention, the following improvements can be implemented, separately or by combining several together.
- the filter having a narrow angular sector may have two straight edges each extending radially with respect to the axis of rotation of the wheel. Cutting it out is then facilitated, from a larger filter sheet that is produced initially;
- the wheel may be provided with at least three filters corresponding respectively to three different spectral filtering windows;
- the filters can constitute several identical groups. In this case, the filters of a single group may all be adjacent in the wheel so that each group of filters is contained in a sector of the wheel without the intercalation of a filter belonging to another group;
- the device may also comprise a system referencing the position of the wheel about the axis of rotation;
- the wheel may comprise a mark shared by two of the adjacent filters, such that a position of this mark appears in a captured image, while respective portions of these two adjacent filters are simultaneously effective for separate parts of the image contained within the peripheral contour of the photosensitive surface of the image sensor; and
- the drive system and a controller of the image sensor may be adapted so that two images that are captured successively by the sensor have an overlap between respective parts of these images that are captured through a single one of the filters.

The device may comprise a unit for the reconstruction of spectral images, adapted in order to produce spectral images that each correspond to the entire photosensitive surface of the image sensor, each spectral image being produced as a juxtaposition of portions of images that are captured by the image sensor through a single one of the filters during at least two different exposures, with a rotation of the wheel between these exposures. Such a reconstruction unit can be situated close to the image sensor, with a physical connection linking them to each other. Alternatively, the unit for the reconstruction of spectral images can be remote from the image sensor with a wireless transmission system provided for transmitting the image data between the image sensor and the reconstruction unit.

A device according to the invention can in particular be used for a spatial imaging application. In this case, it may be adapted to be carried on board an aircraft, a space vehicle or a satellite.

A device according to the invention may be adapted in order to obtain colourized images. Such a colourized image is constructed by combining a panchromatic image, i.e. one that has been captured with a broad spectral window, with images that were captured with narrow spectral windows comprised within the broad window. To this end, three of the filters that are borne by the wheel, corresponding respectively to three different spectral filtering windows, are the filter having a narrow angular sector and said other two filters already mentioned above. The wheel then comprises at least one additional spectral filter that has a broad spectral window comprising those of the filter having a narrow angular sector and of said other two filters. This additional spectral filter itself has an angular extension that is greater than the angular extension of the photosensitive surface of the image sensor when the filters are close to the focal plane, or that is greater than the angular extension of the portion of the intermediate image plane that is optically conjugated with the entire photosensitive surface by the re-imaging part of the image-forming optical system, the angular extension of the additional spectral filter also being measured with respect to the axis of rotation of the wheel. The additional spectral filter is the panchromatic filter, and each panchromatic image can thus be captured during a single acquisition sequence carried out by the image sensor while the wheel is immobilized.

A second aspect of the invention proposes a method for collecting a multispectral image, which comprises receiving at a station installed on the earth, image data relating to images captured by a device according to the first aspect of the invention, this device being on board an aircraft in flight, a space vehicle situated in space or a satellite in orbit when the images were captured. The image data are then transmitted by electromagnetic radiation or by laser signals from the aircraft, space vehicle or satellite to the station on Earth.

Such a collection method may comprise the step of reconstructing the spectral images which together form the multispectral image. During this reconstruction step, each spectral image corresponding to the entire photosensitive surface of the image sensor is produced as a juxtaposition of the parts of images that are captured by the image sensor through a single one of the filters during at least two different exposures, with a rotation of the wheel between these exposures. Such a reconstruction step can be carried out on board the aircraft, space vehicle or satellite, but it can preferentially be carried out on Earth from the image data that are received at the station.

Finally, in order to obtain colourized images, the wheel is equipped with a panchromatic filter in addition to the three filters with narrow spectral windows introduced above according to the invention. The method then also comprises a step of colourization during which spectral images that were captured respectively through the filter having a narrow angular sector and said other two filters are combined with an image that was captured with the additional spectral filter. Thus, an enriched image is obtained, called a colourized image, having spectral information that can be viewed directly by an observer of this enriched image.

BRIEF DESCRIPTION OF THE DRAWING FIGURES

Other features and advantages of the present invention will become apparent from the description below of non-limitative embodiments, with reference to the attached drawings, in which.

DETAILED DESCRIPTION OF THE INVENTION

For reasons of clarity, the dimensions of the elements represented in these figures do not correspond either to actual dimensions or to the relationships between actual dimensions. Moreover, identical references indicated in different figures denote identical elements or those having identical functions.

Figure 3A:
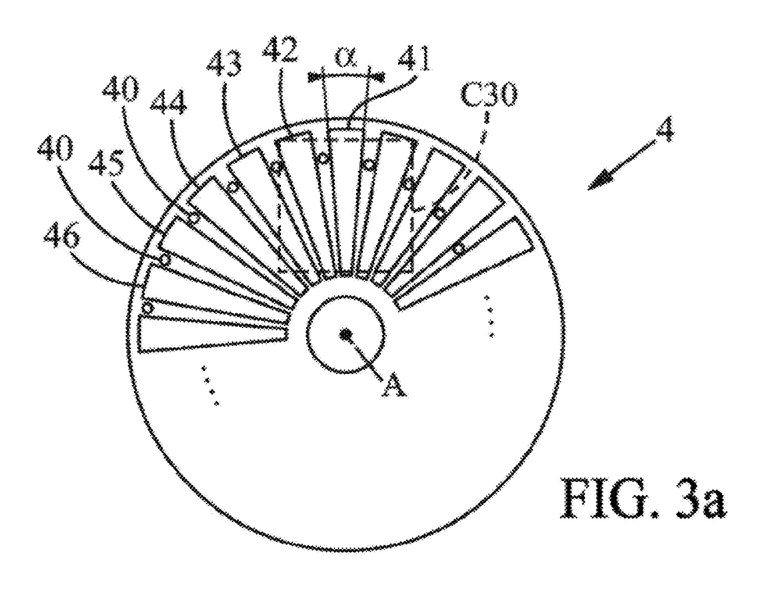
FIGS. 3a to 3d represent four filter wheels according to the present invention.
Figure 3B:
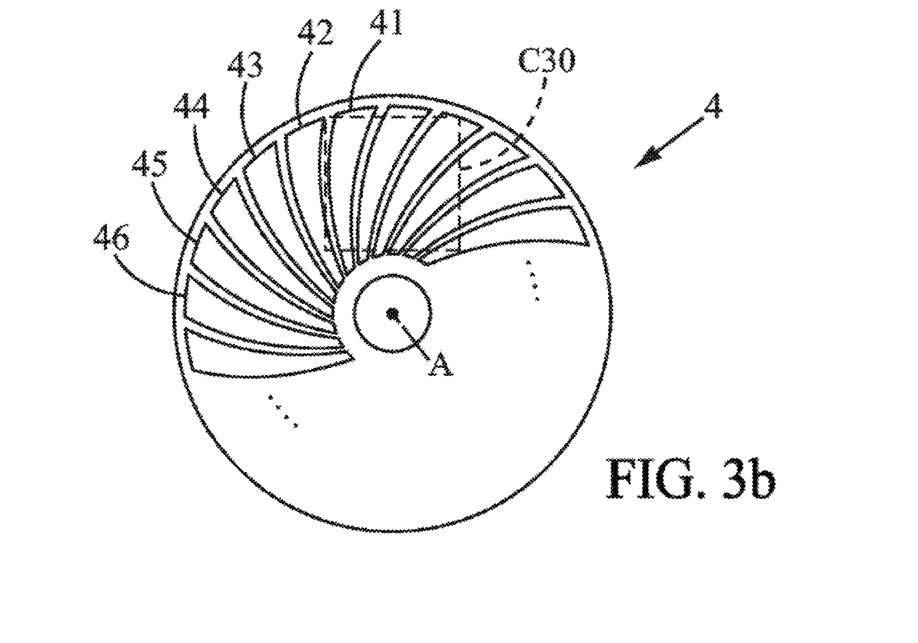
Figure 3C:
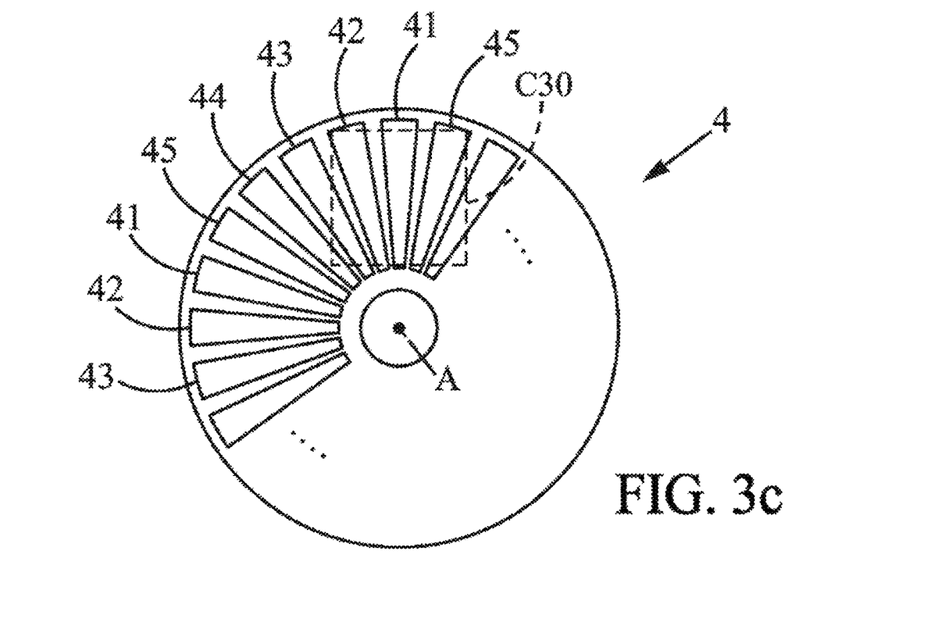

In a multispectral image capture device 10 such as shown in FIG. 1, the filter wheel in FIG. 2 can be replaced by one of the wheels in FIGS. 3a to 3c, in order to apply the invention.

It is understood that although the objective 1 and the re-imaging system 2 are each represented in the form of a single lens, they may be constituted in any way whatever, on the basis of one or more lenses, one or more mirrors, or possibly a combination of at least one lens and at least one mirror.

For example, the wheel 4 in FIG. 3a can be used in the device in FIG. 1. It comprises several filters referenced 41, ... 46, ..., that are efficient in transmission and that may have identical cut-out shapes. Each filter may occupy an angular sector that is comprised between two radii originating from the axis of rotation A-A, and be comprised between a hub of the wheel 4 and a circular peripheral edge thereof. The width of the angular sector of each filter, marked a in FIG. 3a, may be less than 15° (degrees), or even less than 10°, for example equal to approximately 4°. Moreover, two adjacent filters may be brought angularly closer to each other, as far as possible depending on the way in which the filters are held on the wheel, but without overlapping each other.

In such an embodiment of the invention, at least two of the filters 41, ... 46, ... are always superimposed simultaneously with the portion 30 of the plane IP, which corresponds to the image as captured by the sensor 3. Such a superimposition is shown in FIGS. 3a to 3c, indicating the limit C30, which is conjugated with the peripheral contour C3 of the photosensitive surface of the detector 3.

Several modes of capture of a multispectral image can be used alternatively, depending on the commands applied to the drive system 5 and to the image sensor 3.

According to a first operation of a device according to the invention, the wheel 4 may be immobilized while each image is captured by the sensor 3, and rotated between two successive image captures. To this end, the images must be captured with respective periods of exposure of the image sensor that are separate in time. Then, parts of images belonging to two images captured successively, while corresponding to a single one of the filters, may advantageously have an overlap with respect to the scene observed. To this end, the rotation of the wheel 4 between the two images is less than the width a of each of the angular sectors occupied by the filters 41-46. By means of such overlaps, the parts of images that are associated with a single filter, while originating from images captured separately, can easily be joined together in the form of a continuous spectral image. This then forms one of the components of the multispectral image. Typically, the overlaps may themselves have an individual angular width that is less than one tenth of the width a. The rotation of the wheel 4 between two successive exposures of the image sensor 3, is less than that necessary with a filter wheel such as shown in FIG. 2. The two successive exposures of the image sensor assembly 3 can thus be carried out with a shorter intermediate waiting time, so that overall the multispectral image is acquired more rapidly. This overall acquisition period, which is reduced for the complete multispectral image, is particularly advantageous when the device and the scene observed are moving in relation to each other. Such a situation exists in particular for images of the earth captured from a non-geostationary satellite, for example a satellite in low orbit.

Moreover, it may be useful to know or to confirm which of the filters 41-46 is effective for each part of an image such as captured by the sensor 3. A first possibility for this consists of using an additional system for referencing the angular position of the wheel 4. Such systems are well known to a person skilled in the art. They may be incorporated into the drive system 5, or may be separate therefrom. Another possibility consists of adding marks 40 on the wheel 4, at places on the wheel that are situated between adjacent filters. Given that the wheel 4 is close to the intermediate image plane IP, each mark 40 can appear clearly in the image captured by the sensor 3, when the wheel 4 is in a position such that this mark is located in the optical field of the sensor 3. Within the captured image, the mark 40 makes it possible to identify accurately the position of the wheel 4, and to determine which filter was effective in each part of the image. For example, each mark 40 can be a hole drilled in the wheel 4, at a radial distance measured from the axis A-A which varies depending on the two filters that are adjacent to this mark (see FIG. 3a).

According to a second operation of a device according to the invention, the wheel 4 may be driven continuously in rotation, with an angular velocity that may be, but is not necessarily, constant. Such continuous operation reduces the vibration generated by the wheel 4 and its drive system 5. In this case, for each image captured by the sensor 3, certain photosensitive pixels 31 of the sensor 3 may have been only partially exposed to the light beam L through one of the filters. In other words, an edge of one of the filters 41-46, which is parallel to a radial direction of the wheel 4, may have encroached upon the inlet section of the luminous flux in one of the photosensitive pixels 31 during the accumulation phase of this pixel. The measurement of the luminous flux that is then produced by this photosensitive pixel 31 is disturbed, or is insignificant. It may then be advantageous to limit the speed of rotation of the wheel 4 so that each photosensitive pixel 31 can validly produce at least one measurement of luminous flux each time one of the filters 41-46 passes into the individual optical field of this pixel, without an edge of the filter encroaching upon this individual field. The most unfavourable situation occurs when an edge of a newly arriving filter encroaches upon the optical field of one of the pixels 31 just after this pixel has begun a new acquisition sequence. Each filter may be sufficiently angularly extended so that the pixel 31 can finish the acquisition sequence already begun, then complete the accumulation phase of the following acquisition sequence, before the end edge of the filter in its turn reaches the optical field of the pixel 31. In other words, the width a of the angular sector that is occupied by the filter is advantageously greater than the angle of rotation described by the wheel 4 during a period equal to the sum of the total period of the acquisition sequence to be finished and the period of the accumulation phase of the following acquisition sequence. In a known manner, the acquisition function of a photosensitive pixel of the image sensor comprises an accumulation phase during which an electrical signal is accumulated proportionally to the luminous flux that is received during a fixed accumulation period, then a reading phase during which the amplitude of the accumulated signal is detected, then the photosensitive pixel is reinitialized. However, it is not essential for all the photosensitive pixels 31 to be exposed through each of the filters during a complete accumulation phase at each rotation of the wheel 4. Those photosensitive pixels that were validly exposed to the light beam L can be selected, and only the reading signals that were produced by the photosensitive pixels of this selection may be retained. Those photosensitive pixels 31 that were not validly exposed through one of the filters during a rotation of the wheel, will preferentially be exposed through this filter as a priority during a subsequent rotation of the wheel, or during a subsequent pass of the wheel with a filter of the same spectral characteristic. Optionally, a chronological order of command of the photosensitive pixels may be adopted, so that at least some of the photosensitive pixels carry out the acquisition sequence in a synchronized manner with respect to the transitions between the filters.

The marks 40 for referencing the angular position of the wheel 4 may also be used when continuous rotation is imposed by the drive system 5.

As for the mode of operation in which the wheel 4 stops when an image is captured, it may also be advantageous, when the wheel 4 rotates continuously while several images are captured one after another, for the parts of images that relate to the same filter, but which belong to images captured successively, to have overlaps.

In the filter wheel in FIG. 3a, each of the filters 41-46 has two straight edges that extend radially in the wheel 4. FIG. 3b shows another configuration for the filter wheel that is compatible with the invention. This other configuration can be deduced from that in FIG. 3a, by applying a deformation to the wheel by rotation about the axis A-A, with an amplitude of rotation that is variable as a function of the radial distance measured from the axis A-A. The filter wheel in FIG. 3b is obtained in this way, with an amplitude of deformation per rotation that increases progressively as a function of on the radial distance.

In the filter wheels in FIGS. 3a and 3b, all the filters may be different, i.e. they correspond to spectral transmission windows that are different from each other. According to an alternative embodiment of the invention, identical filters may be repeated cyclically about the axis of rotation A-A in a single wheel. For example, the ordered series of filters 41 to 45 is progressively repeated in the wheel in FIG. 3c while rotating about the axis A-A.

For the two image capture operations described above, stopping the wheel 4 during each exposure of the sensor 3 or continuously rotating the wheel 4 while several acquisitions are carried out, the spectral images are then reconstructed from the images acquired by the sensor 3. To this end, for each of the filters 41-46, parts of images that correspond to this filter are sampled from the images acquired successively by the sensor 3. These image parts are then joined together in a single spectral image that corresponds to this filter. This spectral image preferably covers the whole of the optical field of the sensor 3, without any missing strips between two adjacent image parts. In order to guarantee that each spectral image is thus complete, it is advantageous to provide for the overlaps between parts of images that have already been described.

Figure 4:
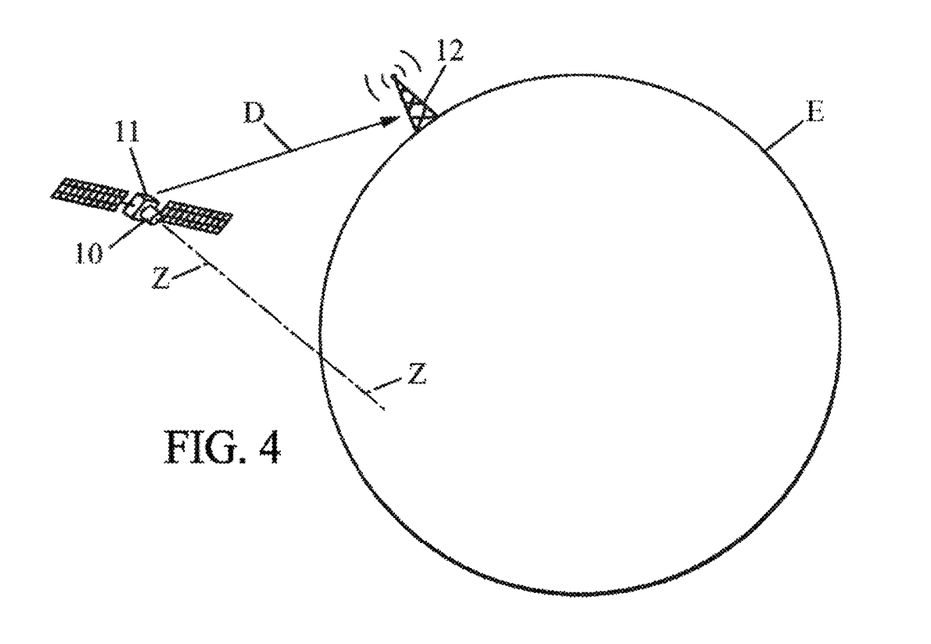
FIG. 4 shows a possible use of a multispectral image capture device according to the invention

According to FIG. 4, the multispectral image capture device 10 may be carried on board a satellite 11 that is in orbit around Earth, marked E. The optical axis Z-Z of the device 10 is pointed in the direction of the area of the earth's surface that it is desired to observe. The image data, marked D in the figure, that are produced by the image sensor at each exposure are transmitted to a receiving station 12 on Earth, either directly or via a relay satellite. One of the known modes for transmitting such data through the earth's atmosphere can be used, such as radio transmission or transmission by laser signals. The reconstruction of the spectral images is carried out by a dedicated unit that can be carried on board the satellite 11, or alternatively situated on Earth. This second solution may be preferred, in order to reduce the load and the energy consumption of the satellite 11. In this case, the data D that are transmitted between the satellite 11 and the receiving station 12 relate to the images as captured by the sensor 3.

Figure 3D:
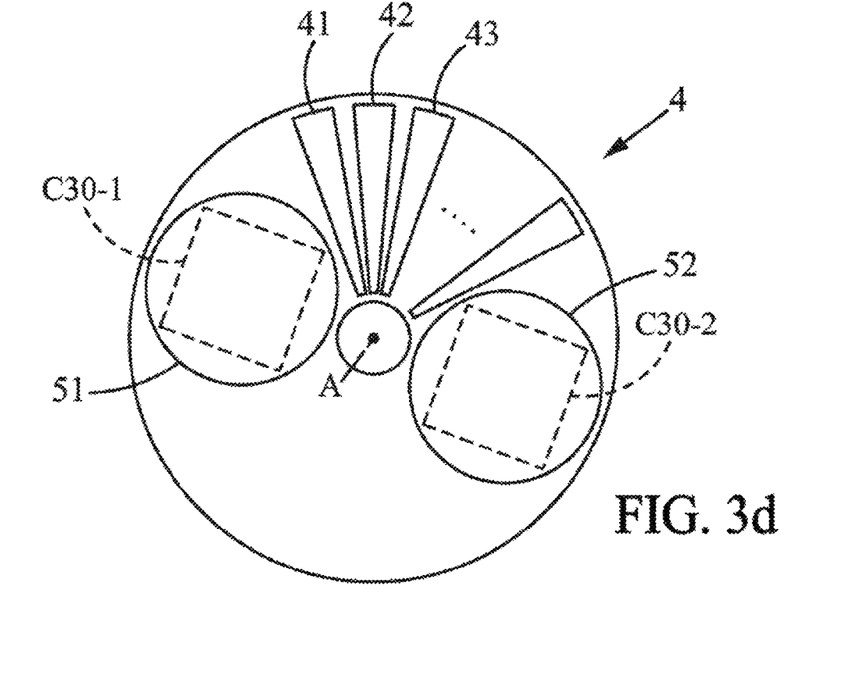

For example, for a surveillance mission from space, in particular from a geostationary satellite, a filter wheel that is according to the invention and to FIG. 3d can be used. References 41 to 43 denote further filters having a narrow angular sector, each corresponding to a narrow spectral transmission window. For this reason, the filters 41-43 are called monochromatic. For example, the filter 41 transmits the colour blue, the filter 42, the colour green, the filter 43, the colour red, etc. for any number of monochromatic filters whatever. The filters 51 and 52 are called panchromatic, because they correspond to a broad spectral transmission window, which can comprise the spectral windows of the monochromatic filters 41-43. Preferably, the panchromatic filters 51 and 52 are sufficiently large in order to each cover the whole optical field of the image sensor. The references C30-1 and C30-2 correspond to the limit C30 for two positions of the wheel 4, for each of which the panchromatic filter 51 or 52, respectively, is active for the whole of the image that is captured by the sensor during the same acquisition sequence. Possibly, a single panchromatic filter can be provided in the wheel 4. An advantageous method of obtaining colour images or video, using such a device, can then comprise the following steps:

/1/ the wheel 4 is first immobilized in the position C30-1, and the pointing of the optical axis Z-Z towards a target area on the earth's surface can then be stabilized, for example during approximately ten seconds;

/2/ then the wheel 4 is rotated continuously so that the monochromatic filters 41-43 pass in front of the image sensor, preferably without exceeding the maximum speed defined by the angular width of each filter so that each photosensitive pixel of the sensor is able to carry out a complete acquisition sequence for each of the filters 41-43. The image sensor then carries out a series of several acquisition sequences while the wheel 4 rotates;

/3/ the wheel 4 is stopped in the position C30-2, and a video acquisition of the target area is carried out during a desired observation period, for example of at least 10 minutes; then /4/ the spectral images that were captured in step /2/ are used to colourize the panchromatic image that was captured in step /3/.

In the case of real-time surveillance, it is necessary to place the colour acquisition before the video: step /2/ is carried out before step /3/. Conversely, if visualization in real time is not essential, the colour acquisition can be carried out after that of the video: step /2/ can be carried out between steps /3/ and /4/. Stabilization of the aim can also be omitted in the latter case. Generally, for such a colour video surveillance method, the rotations of the wheel 4 that are carried out for steps /1/ to /3/ can be in a constant direction, or alternating back and forth.

It is understood that the invention can be reproduced by adapting it with respect to the embodiments that have just been described, while still retaining at least some of the advantages mentioned. In particular, the following adaptations can be implemented:

- each filter may have any shape whatever;
- the filters may be close together in pairs in the wheel so that several filters are always simultaneously in the optical field of the image sensor;
- the filters may occupy a limited part of the wheel only, and the remaining part of the wheel can be dedicated to a function other than spectral filtering;
- the filter wheel may be situated just in front of the image sensor, since the photosensitive surface thereof is situated at the level of the focal plane of the image-forming optical system, which is a focusing plane of the light beam. In this case, it is not necessary for the optical system to comprise a re-imaging system;
- the invention can be applied to filters that are effective in any spectral fields whatever, as well as to any number of different filters whatever. In particular, it can be advantageous in the case of filters of two types only, which are alternated in the wheel in the form of narrow angular sectors. In fact, obtaining such narrow filters of a required quality is facilitated by the reduction in the individual surface area of each filter; and
- finally, the invention is compatible with commercially available raster image sensors. For example, for an airborne application, in particular when the device is carried on board a drone, a rapid raster sensor, i.e. one that is capable of capturing images at a frequency of 120 Hz (Hertz) or more, can supply at least ten multispectral images per second in the case of approximately ten spectral bands.

The invention claimed is:

1. Multispectral image capture device (10), comprising:
an image-forming optical system (1, 2), suitable for forming an image in a focal plane (FP);
at least one two-dimensional image sensor (3), comprising a photosensitive surface limited by a peripheral contour (C3), and situated in the focal plane (FP);
a wheel (4) that comprises a plurality of spectral filters (41-46), arranged in order to keep said filters parallel and close to the focal plane (FP) or to an intermediate image plane (IP) of the image-forming optical system (1, 2); and
a drive system (5), arranged in order to rotate the wheel (4) about an axis of rotation (A-A) so as to bring each of the filters (41-46) into the light beam (L);
in which at least one of the filters (41-46), called filter having a narrow angular sector, has an angular extension that is less than an angular extension of the photosensitive surface of the image sensor (3) when the filters are close to the focal plane (FP), or that is less than an angular extension of a portion (30) of the intermediate image plane (IP) that is optically conjugated with the entire photosensitive surface by a re-imaging part (2) of the image-forming optical system, the angular extensions being measured with respect to the axis of rotation (A-A) of the wheel (4),
the drive system (5) being adapted in order to rotate the wheel (4) continuously while several images are captured successively by the image sensor (3);
wherein the image sensor (3) comprises a plurality of separate photosensitive pixels (31) adapted in order to operate each according to an acquisition sequence that comprises successively at least one phase of signal accumulation and one phase of reading an accumulated signal;
and the angular extension of the filter having a narrow angular sector is greater than an angle of rotation described by the wheel (4) during a sum of a total period of the acquisition sequence and a period of an additional accumulation phase.

2. Device according to claim 1, wherein the filter having a narrow angular sector is situated in the wheel (4) between two other filters, and close to said other two filters so that for any position of the wheel about the axis of rotation (A-A) such that at least a portion of the filter having a narrow angular sector is effective for a part of the image contained within the peripheral contour (C3) of the photosensitive surface of the image sensor (3), a portion of at least one of said other two filters is simultaneously effective for another part of the same image contained within the peripheral contour of the photosensitive surface.

3. Device according to claim 2, wherein the angular extension of the filter having a narrow angular sector and respective angular extensions of said other two filters are such that for at least one position of the wheel (4) about the axis of rotation (A-A), respective portions of the filter having a narrow angular sector and of said other two filters are simultaneously effective for three separate parts of the image contained within the peripheral contour (C3) of the photosensitive surface.

4. Device according to claim 3, wherein respective angular extensions of the filter having a narrow angular sector and of said other two filters, with respect to the axis of rotation (A-A) of the wheel (4) and for the same radial distance from said axis of rotation, are equal.

5. Device according to claim 2, wherein respective angular extensions of the filter having a narrow angular sector and of said other two filters, with respect to the axis of rotation (A-A) of the wheel (4) and for the same radial distance from said axis of rotation, are equal.

6. Device according to claim 1, wherein the filter having a narrow angular sector has two straight edges each extending radially with respect to the axis of rotation (A-A) of the wheel (4).

7. Device according to claim 3, wherein the wheel (4) is provided with at least three filters (41-46) corresponding respectively to three different spectral filter windows.

8. Device according to claim 7 the three filters that correspond respectively to the three different spectral filter windows, are the filter having a narrow angular sector and said other two filters, and the wheel (4) comprises at least one additional spectral filter (51) having a spectral window that comprises the spectral windows of the filter having a narrow angular sector and of said other two filters,
and said additional spectral filter itself has an angular extension that is greater than the angular extension of the photosensitive surface of the image sensor (3) when the filters are close to the focal plane (FP), or that is greater than the angular extension of the portion (30) of the intermediate image plane (IP) that is optically conjugated with the entire photosensitive surface by the re-imaging part (2) of the image-forming optical system, the angular extension of the additional spectral filter also being measured with respect to the axis of rotation (A-A) of the wheel (4).

9. Method for collecting a multispectral image, comprising receiving, at a station (12) installed on Earth (E), image data (D) relating to images captured by a device (10) according to claim 8, said device being on board the aircraft in flight, the space vehicle situated in space or the satellite (11) in orbit when the images are captured, and said image data being transmitted by electromagnetic radiation or by laser signals from said aircraft, space vehicle or satellite to the station on Earth, directly or via a relay satellite, the method comprising a step of reconstructing spectral images together forming said multispectral image, during which each spectral image corresponding to the entire photosensitive surface of the image sensor (3), is produced as a juxtaposition of parts of images captured by the image sensor through a single one of the filters (41-46) during at least two different exposures, with a rotation of the wheel (4) between said exposures, said reconstruction step being carried out on Earth (E) from the image data (D) received at the station (12), the method also comprising a step of colourization during which spectral images captured respectively through the filter having a narrow angular sector and said other two filters are combined with an image captured with the additional spectral filter (51), in order to obtain an enriched image that has spectral information that can be viewed by an observer of said enriched image.

10. Device according to claim 1, wherein the filters (41-45) constitute several identical groups, and the filters of one same group are all adjacent in the wheel (4) so that each group of filters is contained in a sector of the wheel without intercalation of any filter that belongs to another group.

11. Device according to claim 1, further comprising a system for referencing the position of the wheel (4) about the axis of rotation (A-A).

12. Device according to claim 1, wherein the wheel (4) comprises a mark (40) between two of the filters (41-46) that are adjacent in said wheel, so that a position of said mark appears in a captured image while respective portions of said two adjacent filters are simultaneously effective for separate parts of the image contained within the peripheral contour of the photosensitive surface of the image sensor (3).

13. Device according to claim 1, wherein the drive system (5) and a controller of the image sensor (3) are adapted so that two images that are captured successively by the sensor have an overlap between respective parts of said images that are captured through a single one of the filters (41-46).

14. Device according to claim 1, further comprising:
a unit for reconstruction of spectral images, adapted in order to produce spectral images that each correspond to the entire photosensitive surface of the image sensor (3), each spectral image being produced as a juxtaposition of portions of images captured by the image sensor through a single one of the filters (41-46) during at least two different exposures, with a rotation of the wheel (4) between said exposures.

15. Device according to claim 1, adapted to be carried on board an aircraft, a space vehicle or a satellite (11).

16. Method for collecting a multispectral image, comprising receiving, at a station (12) installed on Earth (E), image data (D) relating to images captured by a device (10) according to claim 15, said device being on board the aircraft in flight, the space vehicle situated in space or the satellite (11) in orbit when the images are captured, and said image data being transmitted by electromagnetic radiation or by laser signals from said aircraft, space vehicle or satellite to the station on Earth, directly or via a relay satellite.

17. Method according to claim 16, comprising a step of reconstructing spectral images together forming said multispectral image, during which each spectral image corresponding to the entire photosensitive surface of the image sensor (3), is produced as a juxtaposition of parts of images captured by the image sensor through a single one of the filters (41-46) during at least two different exposures, with a rotation of the wheel (4) between said exposures, said reconstruction step being carried out on Earth (E) from the image data (D) received at the station (12).

18. Device according to claim 1, wherein the wheel (4) is provided with at least three filters (41-46) corresponding respectively to three different spectral filter windows.

* * * * *